United States Patent
Ho et al.

(10) Patent No.: US 6,937,428 B2
(45) Date of Patent: Aug. 30, 2005

(54) REDUCING ACTUATOR ARM OSCILLATION DURING SETTLE MODE IN A DISC DRIVE SERVO SYSTEM

(75) Inventors: Hai Thanh Ho, Westminster, CO (US); Justin Won, Longmont, CO (US); Fadi Youssef Abou-Jaoude, Arvada, CO (US); Gregory Andrew Campbell, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 492 days.

(21) Appl. No.: 09/788,065

(22) Filed: Feb. 16, 2001

(65) Prior Publication Data

US 2003/0206365 A1 Nov. 6, 2003

Related U.S. Application Data

(60) Provisional application No. 60/210,645, filed on Jun. 9, 2000.

(51) Int. Cl.$^7$ .......................... G11B 5/596; G11B 21/02
(52) U.S. Cl. .................... 360/78.06; 318/560; 318/611; 360/75
(58) Field of Search ............................... 360/75, 77.02, 360/77.07, 78.04, 78.06, 78.07, 78.09; 318/560, 561, 590, 592, 611; 369/43

(56) References Cited

U.S. PATENT DOCUMENTS

| | | |
|---|---|---|
| 4,477,755 A | 10/1984 | Rickert |
| 4,536,809 A | 8/1985 | Sidman |
| 4,574,227 A | 3/1986 | Herder et al. |
| 4,894,599 A | 1/1990 | Ottesen |
| 4,965,501 A | 10/1990 | Hashimoto |
| 5,050,016 A | 9/1991 | Squires |
| 5,072,318 A | 12/1991 | Yu |
| 5,189,571 A | 2/1993 | Murphy et al. |
| 5,325,247 A | 6/1994 | Ehrlich et al. |
| 5,510,939 A | 4/1996 | Lewis |
| 5,608,586 A | 3/1997 | Sri-Jayantha et al. |
| 5,608,589 A | 3/1997 | Kang et al. |
| 5,610,487 A | 3/1997 | Hutsell |
| 5,646,797 A | 7/1997 | Kadlec et al. |
| 5,661,615 A | 8/1997 | Waugh et al. |
| 5,691,617 A | 11/1997 | Funches |
| 5,801,905 A | 9/1998 | Schirle et al. |
| 5,901,009 A | 5/1999 | Sri-Jayantha et al. |
| 6,014,285 A * | 1/2000 | Okamura ................. 360/78.04 |
| 6,088,186 A | 7/2000 | Carlson |
| 6,122,125 A | 9/2000 | Clare et al. |
| 6,166,876 A | 12/2000 | Liu |
| 6,377,418 B1 * | 4/2002 | Kagami et al. .......... 360/78.14 |
| 2002/0006009 A1 | 1/2002 | Ooi et al. |
| 2002/0034036 A1 * | 3/2002 | Sri-Jayantha et al. .... 360/77.02 |
| 2002/0041472 A1 * | 4/2002 | Ding et al. ................. 360/290 |

FOREIGN PATENT DOCUMENTS

| | | |
|---|---|---|
| EP | 0 263 962 | 4/1988 |
| EP | 0 314 111 | 3/1989 |

OTHER PUBLICATIONS

Alexi H. Sacks et al., "Advanced Methods For Repeatable Runout Compensation," IEEE Transaction on Magnetics, 1st ed., IEEE Magnetics Society (San Diego, CA, USA), vol. 31 (No. 2), p. 1031–1036, (Feb. 3, 1995).

* cited by examiner

*Primary Examiner*—Andrew L. Sniezek
(74) *Attorney, Agent, or Firm*—David K. Lucente; Derek J. Berger

(57) ABSTRACT

An apparatus and method for compensating actuator arm oscillation induced by resonance mode excitation during a seek in a disc drive data handling system. The actuator arm supports a head adjacent a recording surface, and a servo loop controls the position of the actuator arm. A frequency of actuator arm oscillation is identified, after which a seek is initiated to move the head from an initial track to a destination track on the recording surface. A position error signal (PES) is generated to indicate position of the head relative to the destination track, and a compensation signal is generated by a filter based on the PES and the frequency of oscillation of the actuator arm. The compensation signal is adapted to remove a component of the PES arising from the actuator arm oscillation, and is applied to the servo loop as the head is settled onto the destination track.

16 Claims, 5 Drawing Sheets

REDUCING ACTUATOR ARM OSCILLATION DURING SETTLE MODE IN A DISC DRIVE SERVO SYSTEM

RELATED APPLICATIONS

This application claims priority to Provisional Application No. 60/210,645 filed Jun. 9, 2000.

FIELD THE INVENTION

This invention relates generally to the field of data handling devices, and more particularly, but not by way of limitation, to a method and apparatus for improving servo performance in a disc drive by reducing actuator arm oscillation at the conclusion of a seek.

BACKGROUND

Disc drives are used as primary data storage devices in modern computer systems and networks. A typical disc drive comprises one or more rigid magnetic storage discs which are arranged about a spindle motor for rotation at a constant high speed. An array of read/write heads are provided to transfer data between tracks defined on the disc surfaces and a host computer in which the disc drive is mounted.

The heads are mounted to a rotary actuator assembly and are controllably positioned adjacent the tracks by a closed loop servo control system. The actuator includes an actuator motor (such as a voice coil motor, VCM) and one or more actuator arms which support the heads over the disc surfaces. The servo control system applies currents to the VCM to move the heads in response to detected and estimated positions of the heads as well as command inputs indicating desired positions of the heads.

The servo control system operates in two primary modes: seeking and track following. A seek operation entails moving a selected head from an initial track to a destination track on the associated disc surface through the initial acceleration and subsequent deceleration of the head toward the destination track. For relatively longer seeks, a velocity control approach is used whereby the velocity of the head is repeatedly determined and compared to a velocity profile defining a desired velocity trajectory for the head. Corrections to the amount of current applied to the VCM during the seek are made in relation to velocity error (i.e., the difference between actual and desired velocity).

At such time that the head reaches a predetermined distance away from the destination track (such as one or more tracks away), the servo control system transitions to a settling mode wherein the head is settled onto the destination track. Thereafter, the servo control system enters a track following mode wherein the head is caused to follow the destination track until the next seek operation is performed. Disc drive designs thus typically use proximate time optimal control with a velocity profile to control a head during a seek, a state estimator based controller with relatively slow integration to settle the head onto the destination track, and the same state estimator based controller with relatively fast integration for track following.

A problem that can arise during a seek is oscillation of the head caused by resonance mode excitation of the actuator arm. The abrupt application of current to the VCM to quickly accelerate and decelerate the heads provides broad spectrum excitation of the actuator; depending upon various factors, such as seek length, a particular seek operation may result in the excitation of an actuator arm at a particular resonant frequency (e.g., 800 Hz) with significant amplitude or phase characteristics that cannot be readily rejected by the servo loop. Such oscillation can undesirably extend the total seek time, adversely affecting data transfer rate performance.

Prior art approaches to reducing the effects of such excitations have included modification of the velocity profile to apply current transition shaping, such as proposed by U.S. Pat. No. 4,965,501 issued to Hashimoto; modification of the physical actuator assembly structure to change the resonant frequencies to levels that can be better compensated by the controller, such as proposed by U.S. Pat. No. 5,801,905 issued to Schirle et al.; and the provision of an adaptive table to provide compensation values that are applied during settling mode, such as proposed by U.S. Pat. No. 6,166,876 issued to Liu.

While operable, there are limitations associated with these and other prior art approaches. Changing the current profile to reduce excitation can degrade servo performance by increasing acceleration and deceleration times. Modifying the physical actuator assembly structure to change the mechanical response can be costly and does not lend itself to individual tuning for different electrical offset/mechanical tolerance combinations present within a population of drives during manufacturing. The use of adaptive tables resident in memory imposes a latency cost to access and retrieve a value at each servo interrupt, and this cost becomes increasingly burdensome at higher servo sample rates and with the compensation of larger numbers of harmonics.

Accordingly, there remains a continued need for improvements in the art to compensate for actuator arm oscillation during settling mode, and it is to such improvements that the present invention is directed.

SUMMARY OF THE INVENTION

The present invention is directed to an apparatus and method for compensating actuator arm oscillation induced by resonance mode excitation during a seek in a disc drive data handling system. In accordance with preferred embodiments, the disc drive handling system includes an actuator assembly having an actuator arm which supports a head adjacent a recording surface, and a servo loop which controls the position of the actuator arm.

A frequency of oscillation of the actuator arm due to broad spectrum mechanical resonance excitation is first identified. This oscillation frequency is identified, for example, by performing seeks with the arm involving the abrupt acceleration and deceleration of the arm.

Thereafter, at such time that a seek is initiated to move the head from an initial track to a destination track on the recording surface, a position error signal (PES) is generated to indicate position of the head relative to the destination track. A digital filter, preferably having a second order, linear time-invariant (LTI) construction, generates a compensation signal based on the PES and the frequency of oscillation of the actuator arm. The compensation signal is adapted to remove a component of the PES arising from the actuator arm oscillation, and is applied to the servo loop as the head is settled onto the destination track. Once the servo loop enters a track following mode of operation, the filter is removed from the loop until the next seek.

The application of the compensation signal produces a notch in an error sensitivity function relating the position error signal to an actuator arm oscillatory disturbance. The notch is nominally centered at the frequency of oscillation of the actuator arm. The filter is preferably implemented in firmware used by a programmable servo processor configured to carry out head control operations.

These and various other features as well as advantages which characterize the present invention will be apparent from a reading of the following detailed description and a review of the associated drawings.

DETAILED DESCRIPTION

Figure 1:
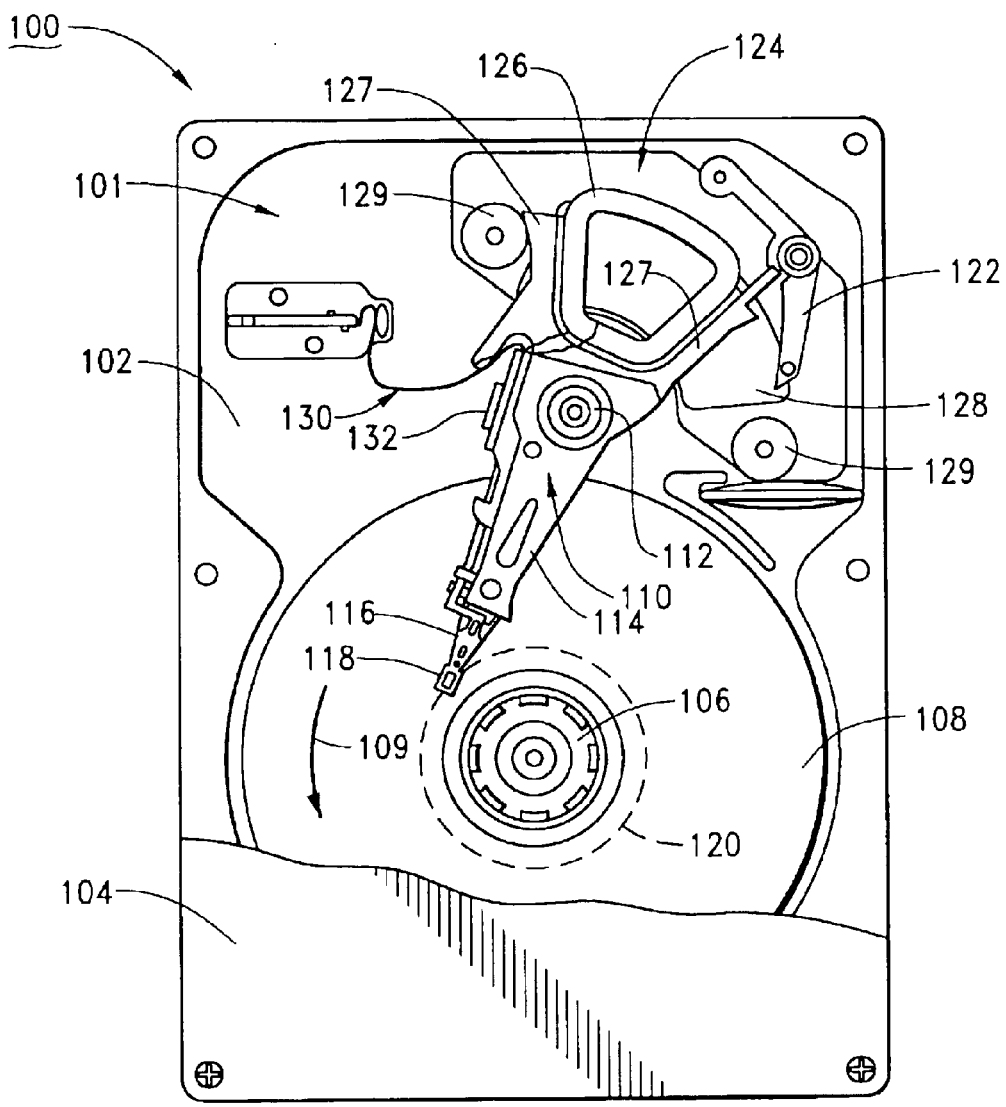
FIG. 1 is a top plan view of a disc drive constructed in accordance with preferred embodiments of the present invention.

Referring to the drawings in general, and more particularly to FIG. 1, shown therein is a top view of a disc drive data handling system 100 (hereinafter "disc drive") constructed in accordance with preferred embodiments of the present invention. The disc drive 100 includes a head/disc assembly (HDA) 101 which houses various mechanical components of the disc drive 100, and a disc drive printed circuit board assembly (PCBA) which supports various electronic communication and control circuits. The PCBA is affixed to the underside of the HDA 101 and is therefore not visible in FIG. 1.

The HDA 101 includes a base deck 102 which, in cooperation with a top cover 104 (shown in partial cut-away), forms an internal housing for the disc drive 100. A spindle motor 106 rotates a number of recording discs 108 in an angular direction indicated at 109. An actuator 110 rotates about a cartridge bearing assembly 112 and includes a number of rigid actuator arms 114 which support flexible suspension assemblies (flexures) 116. The flexures, in turn, support a corresponding number of read/write heads 118 adjacent the respective disc recording surfaces.

When the disc drive is deactivated, the heads 118 are brought to rest upon texturized landing zones 120 and the actuator 110 is secured using a latch 122. During operation, the actuator 110 is rotated by a voice coil motor (VCM) 124 comprising an actuator coil 126 supported by coil support arms 127 adjacent a permanent magnet 128. Compliant limit stops 129 limit the angular extent of actuator travel and serve to protect the actuator from damage. A flex circuit assembly 130 provides communication paths for the actuator 110 and includes a preamplifier/driver circuit (preamp) 132.

Figure 2:
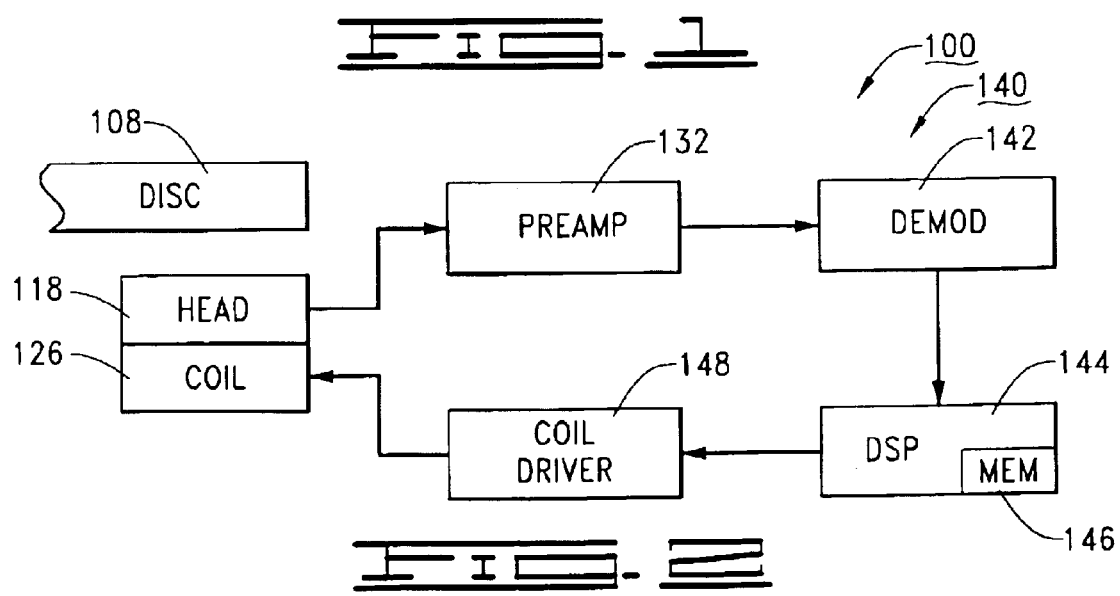
FIG. 2 provides a functional block diagram for a servo circuit of the disc drive of FIG. 1.

FIG. 2 provides a functional block diagram of a servo control circuit 140 (also referred to as "servo circuit" and "servo loop") used to provide closed loop positional control of the actuator 110. Servo position data in the form of radially displaced servo fields written to the discs during disc drive manufacturing are transduced by a selected head 118, preamplified by the preamp 132 and provided to a demodulation circuit (demod) 142 which conditions the data for use by a digital signal processor (DSP) 144.

The DSP 144 generates a position error signal (PES) indicative of head position and outputs a current correction signal to a coil driver circuit 148 to adjust the current applied to the coil 126, and hence, the position of the selected head 118. The DSP 144 operates in accordance with commands from a top level disc drive processor (not shown) and programming steps provided in DSP memory (MEM) 146. The DSP 144 performs seeks to move the head from one track to another, and track following operations to cause the head to follow a selected track.

Figure 3:
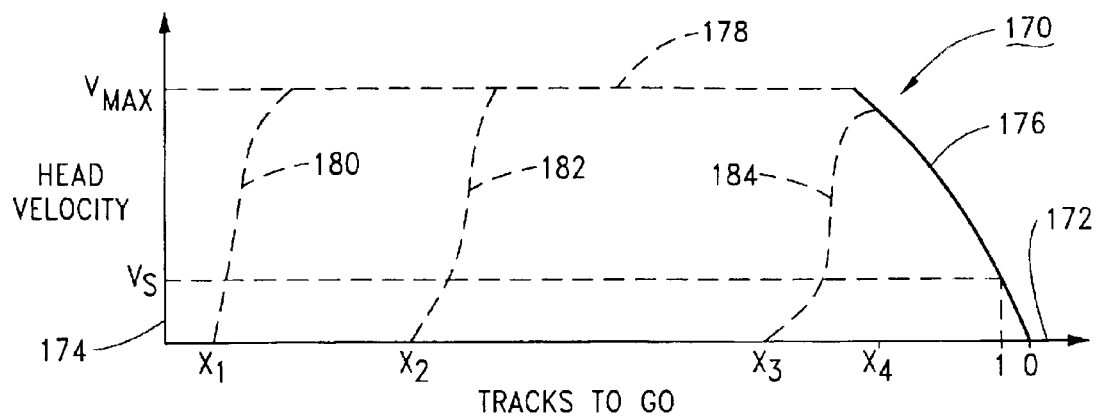
FIG. 3 is a graphical representation of a family of velocity profile curves used by the servo circuit of FIG. 2 to execute velocity controlled seeks.

FIG. 3 shows a family of seek velocity profiles 170 used by the servo circuit 140 to move a selected head 118 from an initial track to a destination track on an associated disc surface during a seek. The profiles are plotted against an x-axis 172 indicative of position (measured in tracks to go, with "0" denoting the destination track) and a y-axis 174 indicative of head velocity.

A deceleration portion 176 (common for all of the velocity profiles) defines the desired velocity of the head 118 as the head approaches the destination track. The deceleration portion extends to a maximum velocity Vmax (dotted line 178) which is a maximum velocity that the head attains during seeking. The deceleration portion 176 meets the Vmax line 178 at a track X4, which is a selected number of tracks away from the destination track.

FIG. 3 shows a number of different acceleration portions 180, 182, 184 (beginning at tracks X1, X2 and X3, respectively). When the disc drive 100 performs a seek operation from track X1 to track 0, the head 118 is first accelerated along portion 180, coasts at Vmax along portion 178, and then decelerates along portion 176 to reach the destination track. During the seek, the actual velocity of the head 118 is repetitively measured and compared to the associated desired velocity of the velocity profile, and the current is adjusted accordingly to cause the head to nominally follow the trajectory of the velocity profile. Seeks from the other tracks X2 and X3 are similarly performed. It will be noted that the seek from track X3 does not reach Vmax before initiating deceleration along portion 176.

Figure 4:
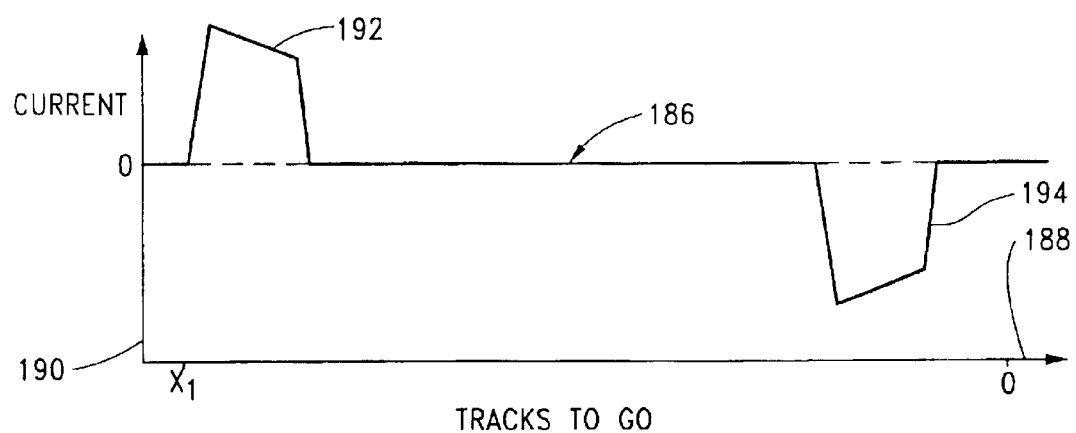
FIG. 4 is a corresponding graphical representation of a current profile used during a seek.

FIG. 4 shows a corresponding current curve 186 plotted against position x-axis 188 and magnitude y-axis 190 and corresponding to the seek from track X1 to track 0. That is, a large amount of current 192 is initially applied to the coil 126 to cause the head 118 to accelerate along portion 180. Once the head reaches Vmax, very little additional current is required to maintain the head at this velocity. Once the head reaches track X4, a correspondingly large amount of current of opposite polarity 194 is applied to the coil 126 to decelerate the head along portion 176 to the destination track.

When the head 118 reaches a selected distance from the destination track (such as one track away, as shown in FIG.

3), the servo circuit 140 transitions from a seek mode to a settle mode to settle the head 118 onto the destination track in as short a time as possible. At one track away from the destination track 0, the head 118 should desirably have a velocity Vs, as indicated in FIG. 3.

Figure 5:
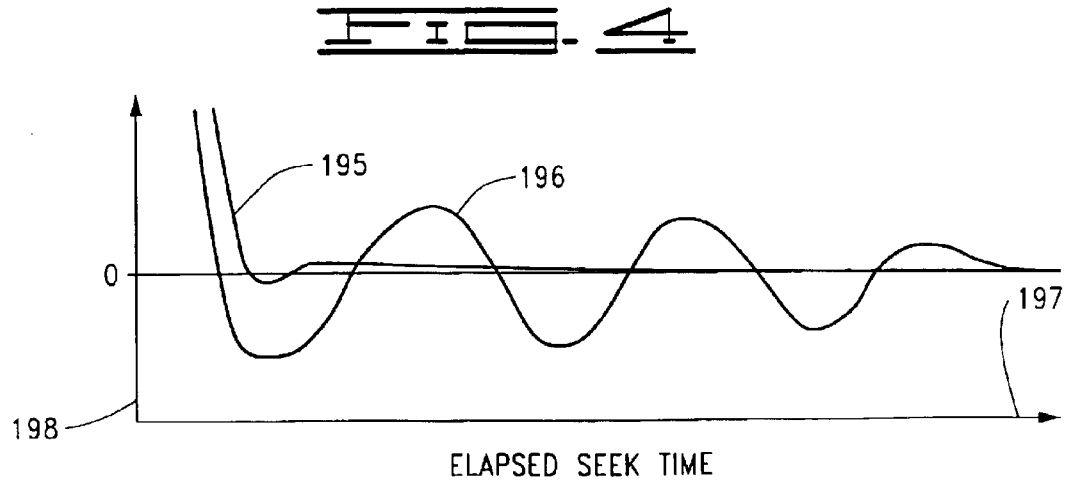
FIG. 5 is graphical representation of a pair of head trajectory curves during settle mode at the conclusion of a seek, with one trajectory curve exhibiting good settle characteristics and the other trajectory curve exhibiting excessive actuator arm oscillation induced during the seek.

It will be noted that each seek length presents a slightly different mechanical excitation profile to the actuator structure. Hence, under certain conditions a particular seek length may result in the undesired mechanical oscillation of an actuator arm 114 at the concluding portions of the seek. FIG. 5 shows a pair of velocity trajectory curves 195, 196 during settle mode (plotted against elapsed time x-axis 197 and position y-axis 198). The curve 195 generally illustrates desired settle characteristics, but the curve 196 exhibits ringing oscillation of the actuator arm 114 induced during the seek operation, resulting in overshoot and increased settle time. The oscillation frequency, phase and harmonic spectrum characteristics will be determined primarily by the actuator structure.

Figure 6:
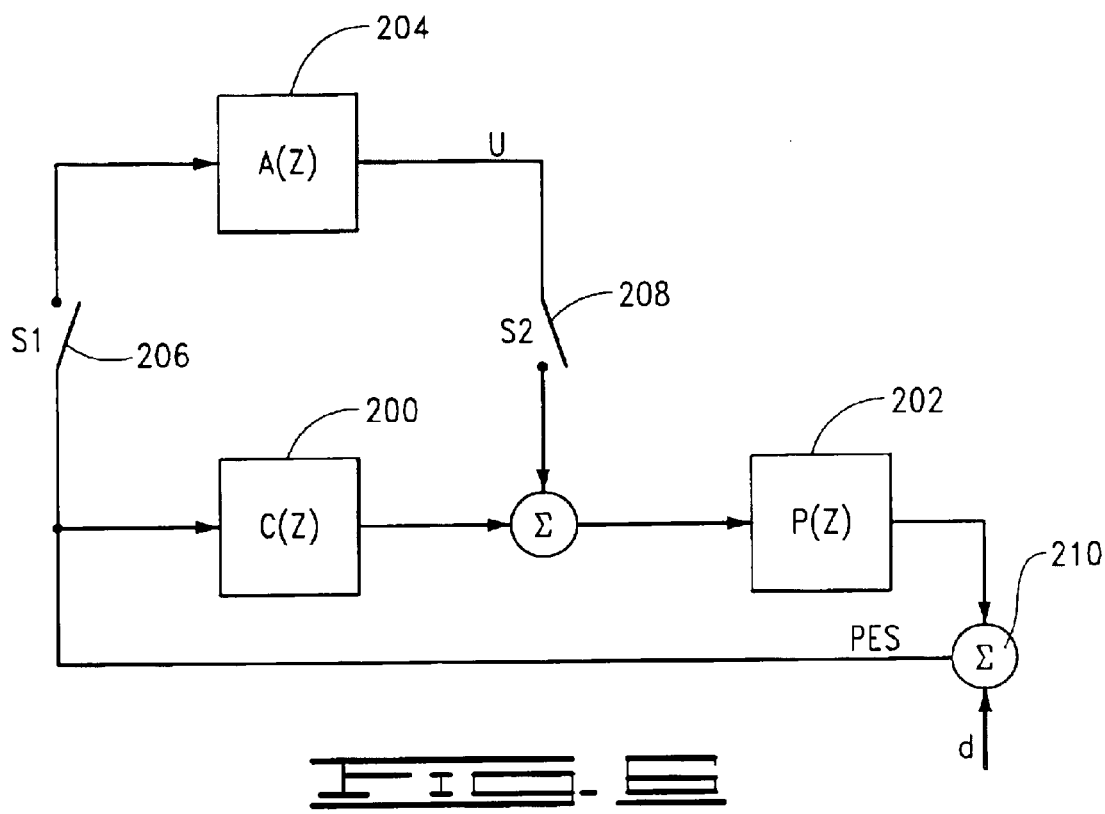
FIG. 6 is a control diagram of the servo circuit of FIG. 2 including a filter block in accordance with preferred embodiments.

To compensate for such oscillation, FIG. 6 provides a control block diagram for the servo circuit 140 of FIG. 2 in accordance with preferred embodiments of the present invention. The diagram includes a controller block C(z) 200, plant block P(z) 202, filter block A(z) 204, and switches S1, S2 (denoted as 206, 208). The controller 200 represents that portion of the DSP operation that operates to generate current command signals during the seek; hence, the controller provides velocity control during seek mode and transitions to position control during settle and track following mode. The plant 202 describes remaining portions of the servo circuit 140, including coil driver 148, coil 126, head 118, preamp 132 and demodulator 142, and generates position error signal (PES) samples which are provided as inputs to the controller 200 and filter 204. The filter 204 preferably comprises a digital filter constructed and operated as discussed below, and the switches S1, S2 operate to switch in the filter 204 at selected times, such as during settle mode. At this point it will be noted that the filter 204 and switches are advantageously implemented in programming (firmware) used by the DSP 144, but can alternatively be implemented in hardware as desired.

To understand the manner in which the filter 204 is constructed and operated, it will first be convenient to consider the oscillation of a selected actuator arm 114 at concluding portions of a seek as a disturbance signal d injected into the PES as shown at summing junction 210. The filtered cancellation signal from the filter 204 (provided via S2 switch 208) is denoted as cancellation signal u.

The disturbance will be contemplated as having selected amplitude and phase characteristics, and can be expressed in accordance with the following relationship:

$$d_0(k) = A(k)\cos(\omega_0 kT + \theta(k)) \quad (1)$$

where k is the sampling index, A is the amplitude of the disturbance, $\omega_0$ is the frequency of the disturbance, T is the sampling period and $\theta$ is the phase of the disturbance. Using this relationship, the digital value of the feedforward control signal can be represented as follows:

$$u(k) = a(k)\cos(\omega_0 kT) + b(k)\sin(\omega_0 kT) \quad (2)$$

It will be noted that the present discussion contemplates a single-input, single-output (SISO) discrete time stochastic system, but it will be understood that the invention is also applicable to other system configurations. Transfer functions and signals are expressed in the discrete time domain using the time index, k, and the unit delay operator $q^{-1}$.

Figure 7:
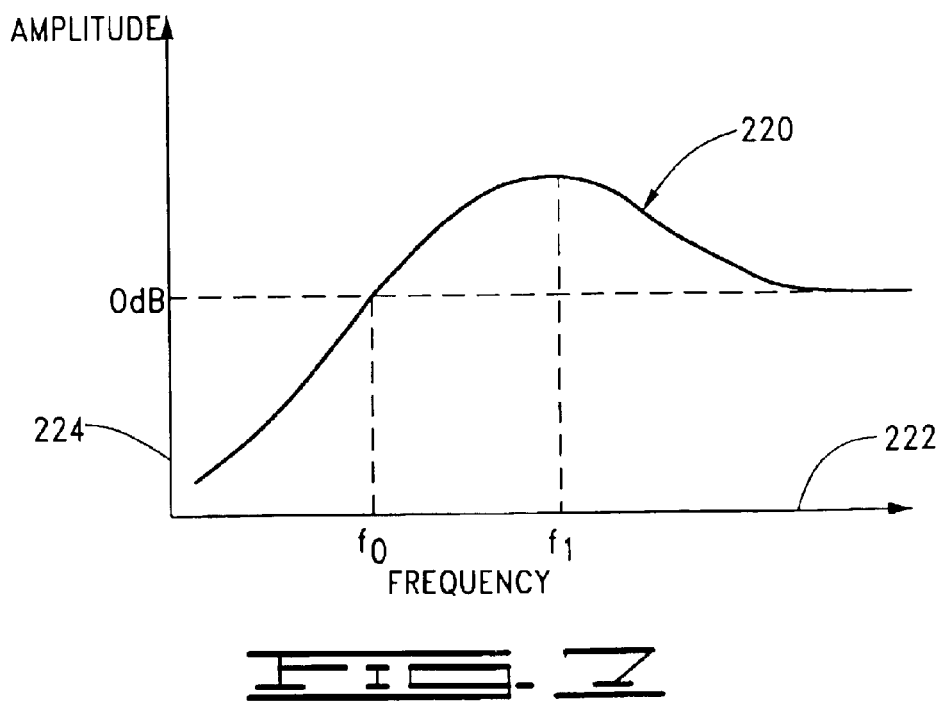
FIG. 7 is graphical representation of an error sensitivity function for the servo loop of FIG. 6 without the filter block.

FIG. 7 shows a graphical representation of an error sensitivity function S (curve 220) as a function of disturbance frequency f. The curve 220 is plotted against frequency x-axis 222 and amplitude (dB) y-axis 224. The error sensitivity function S relates the magnitude of the position error signal (PES) arising from the disturbance to the magnitude of the disturbance itself. Thus, the error sensitivity function can be expressed as:

$$S = \frac{PES}{d_0} \quad (3)$$

From FIG. 7 it will be noted that below a frequency $f_0$ the value of the error sensitivity function S is below 0 dB, and above the frequency $f_0$, S is above 0 dB. Thus, below $f_0$ the magnitude of the oscillatory disturbance is attenuated in the PES, and above $f_0$ the disturbance is magnified in the PES. The value of the error sensitivity function S is at a maximum at a frequency $f_1$, above which the value of the function reduces to 0 dB again. From FIGS. 6 & 7, the PES can be represented as follows:

$$PES(k) = S(q^{-1})d_0(k) - P(q^{-1})u(k) \quad (4)$$

Figure 8:
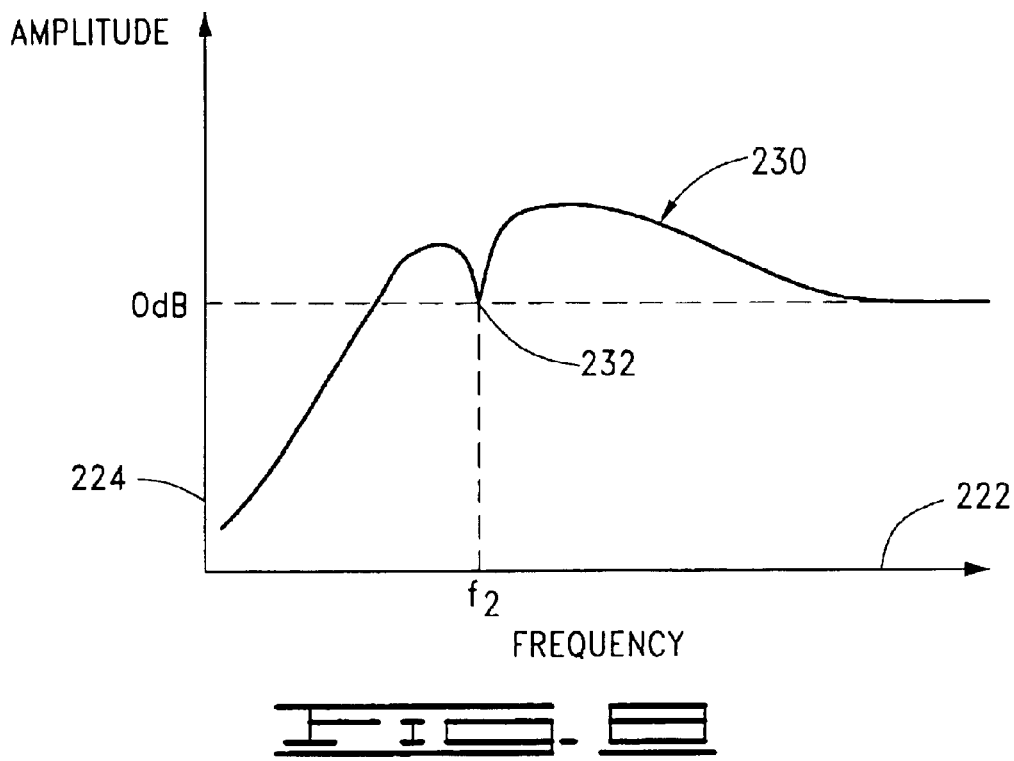
FIG. 8 shows the error sensitivity function of FIG. 7 with a notch introduced by the filter block of FIG. 6.
Figure 9:
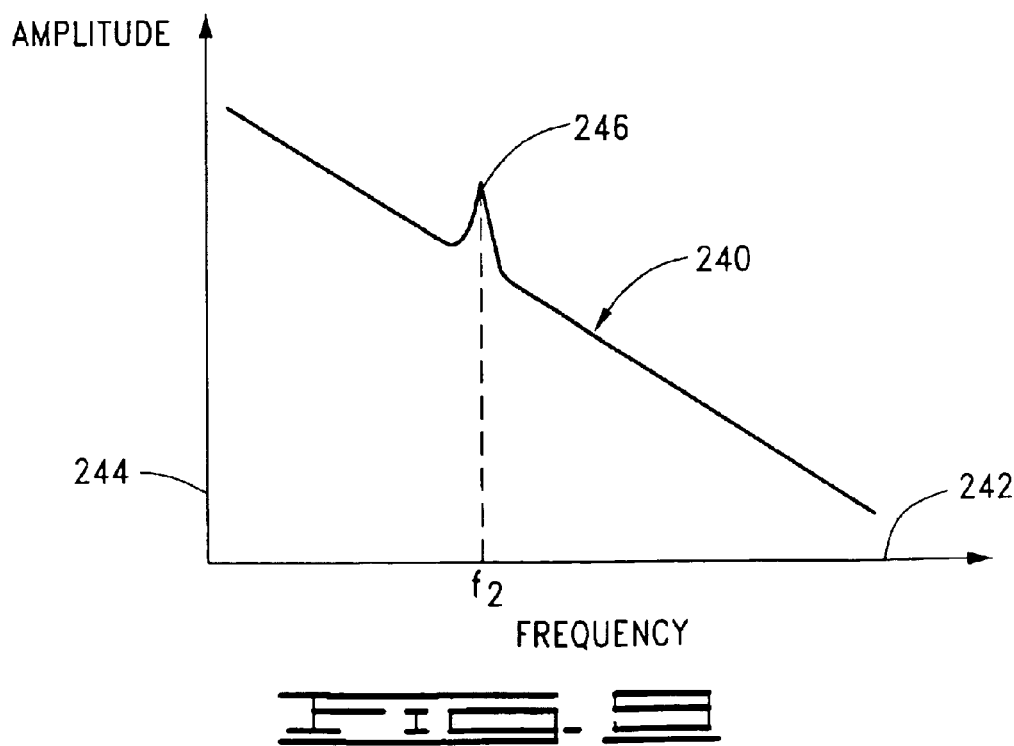
FIG. 9 provides a graphical representation of open loop gain of the servo loop of FIG. 6 with a peak corresponding to the notch of FIG. 8.

In accordance with preferred embodiments, the filter 204 places one or more notches in the error sensitivity function S to remove the effects of actuator arm oscillation. FIG. 8 provides a graphical representation of another error sensitivity function S (curve 230, plotted against axes 222, 224) with a notch 232 implemented at frequency $f_2$. The notch is designed to filter out (decrease) the effect of the disturbance on the PES at the frequency $f_2$. FIG. 9 provides a corresponding open loop gain curve 240 (plotted against frequency x-axis 242 and gain L y-axis 244). The error sensitivity function S is related to the open loop gain of the servo loop by the following relation:

$$S = \frac{1}{1+L} \quad (5)$$

Thus, the notch 232 in the error sensitivity function S in FIG. 8 results in a corresponding spike 246 in the open loop gain function of FIG. 9 at the same frequency. Using the gradient of steepest descent and normalization of the quadrature sine input vector, the normalized least means square (NLMS) update law computes the terms a(k) and b(k) for each PES sample as follows:

$$a(k+1) = a(k) + \frac{\mu_0}{\alpha}\cos(\omega_0 kT + \theta)PES(k) \quad (6)$$

$$b(k+1) = b(k) + \frac{\mu_0}{\alpha}\sin(\omega_0 kT + \theta)PES(k) \quad (7)$$

where $$0 < \mu_0 < 4 \quad (8)$$

$$\alpha = |P(e^{j\omega T})S(e^{j\omega T})|_{\omega = \omega_0} \quad (9)$$

$$\phi = arg\{P(e^{j\omega T})S(e^{j\omega T})\}|_{\omega = \omega_0} \quad (10)$$

with $\mu_0$ comprising a convergence factor representing the learning rate and controlling the width of the notch produced in the error sensitivity function S. The value $\alpha$ represents the magnitude of the nominal closed loop gain of the servo loop, and the value $\phi$ represents the phase response of the nominal closed loop gain of the servo loop. The parameters $\alpha$ and $\phi$ are determined by measuring the frequency response of the servo loop (in the presence of the disturbance, as discussed below) and then used as a priori knowledge to provide a loop matching effect. The resulting NLMS update law of Equations (6) and (7) exhibits dependable exponential convergence of the parameters a(k) and b(k). Prior art runout cancellation filters do not employ such loop matching, and can therefore be prone to divergence for larger learning rates. The normalizing of the learning rate with $\alpha$ results in a consistent convergence rate for any targeted frequency $\omega_0$. A larger $\mu_0$ allows better tracking of A(k) and 2(k).

It has been determined that the filter described above, appearing to be adaptive-nonlinear-time-varying, in fact provides a second-order, linear, time-invariant (LTI) system. This linear, time-invariant system can be described by the following relation:

$$A(z) = \frac{u_{ff}}{PES} = \frac{z^2\left[\frac{\mu_0}{\alpha}\cos(\phi)\right] - z\left[\frac{\mu_0}{\alpha}\cos(\phi + \omega_0 T)\right]}{\frac{z^2}{\eta} - z[2\cos(\omega_0 T)] + \eta} \quad (11)$$

where

A(z) is the response of the filter section;

z is the z transform;

$\omega_0$ is the frequency of the notch;

$\eta$ controls the depth of the notch;

$\mu_0$ controls the width of the notch;

$\alpha$ is a gain parameter indicative of the closed loop gain of the servo loop at $\omega_0$;

$\phi$ is a phase parameter indicative of the closed loop phase response of the servo loop at $\omega_0$, and T is the sampling period.

Like the $\eta$ is determined by measuring the frequency response of the servo loop and is used as a priori knowledge. While actuator arm oscillation will typically exist at one primary resonant frequency, additional filter sections can be used as desired to account for different resonance modes of the arms.

The open-loop gain of the servo circuit with the filter 204 can be represented as:

$$L(z)=P(z)C(z)+P(z)A(z) \quad (12)$$

and the error sensitivity function can be represented as:

$$S(z) = \frac{1}{1 + P(z)C(z) + P(z)A(z)} \quad (13)$$

The filter 204 implemented using equation (11) is a stabilizing peaking filter. It is scalable because it can be deployed at substantially any frequency including near or at crossover frequencies. Because of the loop matching effect, equation (11) reliably provides a notch on the error transfer function S at the desired frequency $\omega_0$.

In an illustrative embodiment, the filter 204 includes a table (not separately shown) that stores the parameters $\alpha$, $\phi$, $\mu$, $\eta$ and T for each arm which are then used for seeks associated with the head (or heads) supported by the arm. Particularly, during a velocity controlled seek, the S1 switch 206 (FIG. 6) is closed to initialize the filter 204, but the switch S2 208 remains open until commencement of settle mode, at which point the switch S2 is closed as well. Once the settle mode is completed and the controller switches to track follow mode, the switches S1 and S2 are then opened until the next seek sequence.

Figure 10:
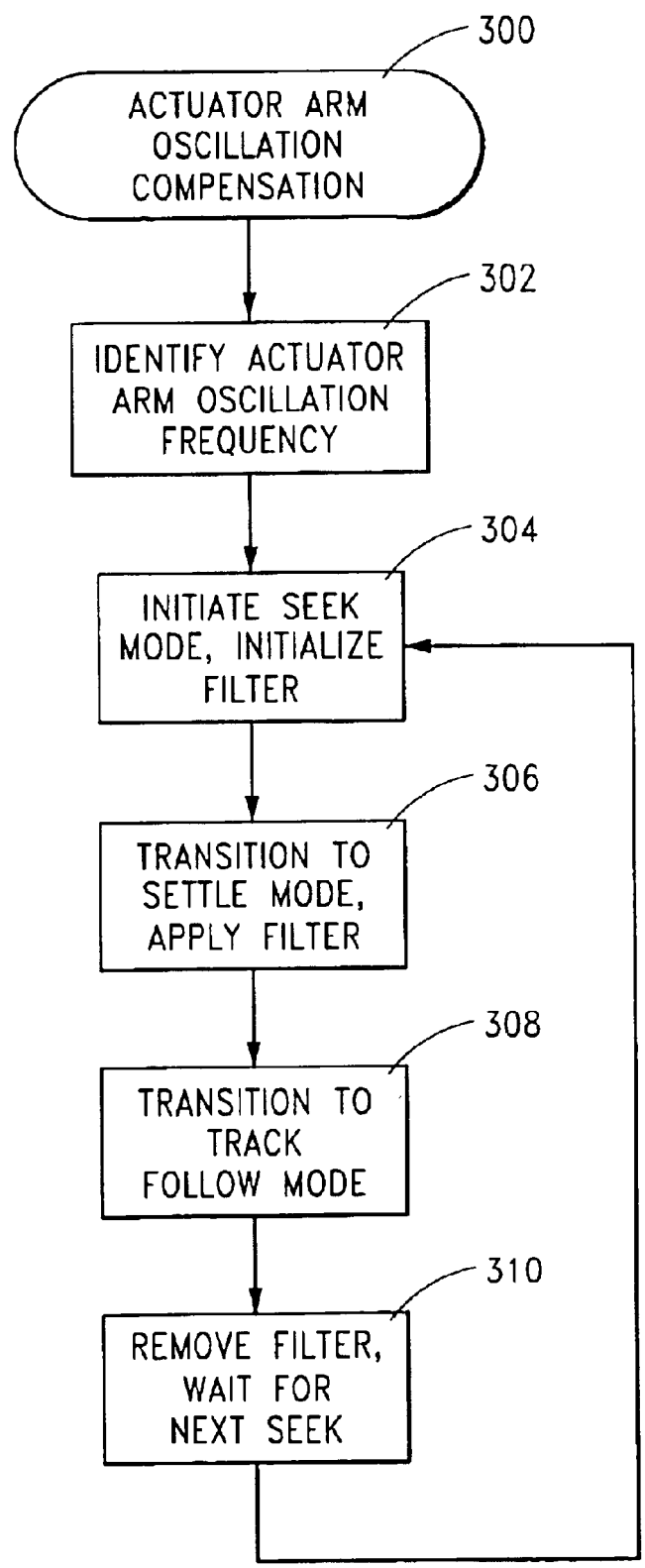
FIG. 10 provides a flow chart for an actuator arm oscillation compensation routine to set forth steps carried out in accordance with preferred embodiments of the present invention to remove the effects of actuator arm oscillation during a seek.

FIG. 10 provides a flow chart for an actuator arm oscillation compensation routine 300, illustrative of steps carried out in accordance with preferred embodiments of the present invention to compensate for oscillation of an actuator arm induced by resonance mode excitation during a seek.

At step 302, the resonance characteristics of each arm is measured in turn to identify the frequency (or frequencies) $\omega_0$ at which the arm oscillates due to broad spectrum excitation. Such measurements can be carried out in a variety of ways. One preferred methodology is generally discussed in U.S. Pat. No. 5,661,615 issued to Waugh et al., assigned to the assignee of the present invention, in which test seeks with abrupt changes in acceleration and deceleration current are performed, after which resonance frequency and phase are measured by analyzing PES samples using a suitable analysis methodology, such as discrete fourier transform (DFT). The remaining parameters are then selected for the filter 204 to compensate such oscillation and the parameter values are stored for subsequent use. Such operation can occur during manufacturing or subsequent field use. Moreover, the parameters can be selected and adjusted based on empirical evaluation of settle characteristics over time.

Thereafter, upon initiation of a seek for a selected head 118, as shown by step 304, the S1 switch 206 is preferably closed to initialize the filter 204. At such time that the servo circuit 140 transitions to settle mode, as shown at step 306 the S2 switch 208 is also closed which serves to switch in the filter 204 which applies filtering to the PES to compensate for arm oscillation. It will be noted that the filter 204 is preferably switched in regardless whether the particular seek operation in fact induced oscillation in the arm, as the operation of the filter will not adversely affect servo operation in the absence of such oscillation. In alternative embodiments the filter 204 can be configured to only switch in for seek lengths previously found to present unacceptable settling characteristics.

Once the head 118 achieves on-track qualification, the servo circuit 140 transitions to track follow mode at step 308 and the switches S1, S2 are then opened to remove the filter 204 from the loop, step 310. The routine then returns to step 304 at commencement of the next seek operation.

Alternatively characterized, one embodiment of the present invention is directed to a method for canceling actuator arm oscillation induced by resonance mode excitation of the actuator arm in a data handling system 100, comprising steps of identifying a frequency of actuator arm oscillation induced by resonance mode excitation (step 302); initiating a seek to move the head from an initial track to a destination track on the recording surface (step 304); receiving a position error signal indicative of a position of the head relative to the destination track as the head settles onto the destination track, generating a compensation signal based on the position error signal and the frequency of actuator arm oscillation and configured to remove a component of the position error signal arising from actuator arm oscillation at the frequency of oscillation induced by the seek, and applying the compensation signal to the servo loop as the head is settled onto the destination track (step 306).

In a further embodiment, the method further comprises abruptly accelerating and decelerating the actuator arm to subject the actuator arm to a broad spectrum excitation, and measuring the actuator arm oscillation resulting from the excitation. In another embodiment, the method further comprises a step of entering a track following mode to cause the head to remain over the destination track while removing the compensation signal from the servo loop (steps 308, 310).

In another embodiment, the application of the compensation signal produces a notch 232 in an error sensitivity function 230 relating the position error signal to an actuator arm oscillatory disturbance, wherein the notch is nominally centered at the frequency of oscillation of the actuator arm. In accordance with a further embodiment, the compensation signal is generated in accordance with the following relation:

$$A(z) = \frac{u_{ff}}{PES} = \frac{z^2\left[\frac{\mu_0}{\alpha}\cos(\varphi)\right] - z\left[\frac{\mu_0}{\alpha}\cos(\varphi + \omega_0 T)\right]}{\frac{z^2}{\eta} - z[2\cos(\omega_0 T)] + \eta} \quad (14)$$

where $u_{ff}$ is the compensation signal, PES is the position error signal, z is the z transform, $\omega_0$ is the frequency of the notch, $\eta$ controls the depth of the notch, $\mu_0$ controls the width of the notch, $\alpha$ is a gain parameter indicative of the closed loop gain of the servo loop at $\omega_0$, $\phi$ is a phase parameter indicative of an RV loop phase response of the servo loop at $\omega_0$, and T is a sampling period.

The present invention is further directed to a data handling system 100 including a recording surface 108 on which a plurality of nominally concentric tracks are defined and an actuator assembly 110 comprising an actuator arm 114 which supports a head 118 adjacent the recording surface. A servo circuit 140 includes a servo controller 200 which controls position of the head in response to a position error signal indicative of position of the head with respect to the recording surface, the servo controller configured to perform a seek operation to move the head from an initial track to a destination track. The servo circuit further includes a filter 204 operably coupled in parallel with the servo controller to receive the position error signal and to generate a compensation signal during a settle mode as the head is brought to rest over the destination track. The compensation signal is based on the position error signal and a frequency of actuator arm oscillation induced by resonance mode excitation during the seek. The compensation signal is adapted to cancel a component of the position error signal arising from the oscillation of the actuator arm, the frequency of oscillation determined during a previous seek operation. In a further embodiment, the filter 204 is a second order, linear time-invariant (LTI) filter configured as discussed above.

For purposes of the appended claims, it will be understood that the function of "identifying a frequency of actuator arm oscillation induced by resonance mode excitation during a seek operation wherein the head is moved from an initial track to a destination track, and for thereafter canceling a component of the oscillation during a settle mode during which the head is brought adjacent a selected track" is performed by means including the servo circuit 140 including controller 200 and filter 204 in accordance with the flow chart of FIG. 10. It will further be understood that prior art structures, such as disclosed in the aforementioned U.S. Pat. No. 4,965,501 to Hashimoto; U.S. Pat. No. 5,801,905 to Schirle et al.; and U.S. Pat. No. 6,166,876 issued to Liu, are not included within the scope of the claim and are further expressly excluded from the definition of an "equivalent" of the foregoing structure.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method comprising the steps of:
initiating a seek to move a moveable arm from an initial position to a destination position;
receiving a position error signal indicative of a position of the moveable arm;
generating a compensation signal based on the position error signal, a loop matching and an oscillation frequency of the moveable arm and adapted to minimize a component of the position error signal arising from the oscillation frequency; and
applying the compensation signal to control the moveable arm as a feedforward signal as the moveable arm settles onto the destination position.

2. The method of claim 1, further comprising a step of entering a track following mode to cause the head to remain over the destination track while removing the compensation signal from the servo loop.

3. The method of claim 1 further comprising the step of identifying the oscillation frequency of the moveable arm induced by a resonance mode excitation.

4. The method of claim 3, wherein the identifying step comprises steps of abruptly accelerating and decelerating the actuator arm to subject the actuator arm to a broad spectrum excitation, and measuring the actuator arm oscillation resulting from the excitation.

5. The method of claim 1, wherein the applying step produces a notch in an error sensitivity function relating the position error signal to a moveable arm oscillatory disturbance.

6. The method of claim 5, wherein the compensation signal is generated in accordance with the following relation:

$$A(z) = \frac{u_{ff}}{PES} = \frac{z^2\left[\frac{\mu_0}{\alpha}\cos(\varphi)\right] - z\left[\frac{\mu_0}{\alpha}\cos(\varphi + \omega_0 T)\right]}{\frac{z^2}{\eta} - z[2\cos(\omega_0 T)] + \eta}$$

where $u_{ff}$ is the compensation signal, PES is the position error signal, z is a z transform function, $\omega_0$ is a nominal frequency of the notch, $\eta$ controls a nominal depth of the notch, $\mu_0$ controls a nominal width of the notch, $\alpha$ is a gain parameter indicative of a closed loop gain of the servo loop at $\omega_0$, $\phi$ is a phase parameter indicative of a phase response of the servo loop at $\omega_0$, and T is a sampling period.

7. An apparatus comprising:
a controllable structure; and
a servo circuit coupled to control the controllable structure, comprising:
a servo controller which controls position of the controllable structure in response to a position error signal indicative of a position of the controllable structure, the servo controller configured to perform a seek operation to move the controllable structure from an initial position to a destination position; and
a filter operably coupled in parallel with the servo controller to receive the position error signal and to generate a compensation signal for a settle mode as the controllable structure is brought over the destination position, the compensation signal based on the position error signal, a phase response of at least the servo circuit and an unwanted oscillation frequency, the compensation signal adapted to cancel a component of the position error signal arising from the unwanted oscillation frequency.

8. The data handling system of claim 7, wherein the servo circuit further comprises:
- a demodulator which generates the position error signal in response to servo data transduced by the head from the recording surface; and
- a motor driver which applies a current to an actuator motor to move the actuator arm, wherein the servo controller generates a current command signal which is combined with the compensation signal to generate a modified current command signal which is used by the motor driver to apply current to the actuator motor.

9. The data handling system of claim 7, wherein the servo circuit determines the frequency of oscillation by abruptly accelerating and decelerating the actuator arm to subject the actuator arm to a broad spectrum excitation, and measuring the actuator arm oscillation resulting from the excitation.

10. The data handling system of claim 7, wherein the filter comprises a second order, linear time-invariant filter with a trigonometric function based transfer function.

11. The data handling system of claim 7, wherein the actuator assembly comprises a plurality of actuator arms each supporting at least one head, and wherein the filter is configured to independently compensate oscillation of each arm.

12. A method of minimizing a frequency relative to a position error signal of a controlled system independent of whether the frequency is a resonance mode of the controlled system, wherein the minimizing is based in part on a loop matching.

13. The method of claim 12 that is further capable of minimizing a frequency relative to a position error signal of a controlled system, the frequency is not a resonance mode of the controlled system.

14. A method comprising increasing a sensitivity of a control system at a frequency to minimize a frequency relative to a position error signal, wherein the increasing is based in part on a phase response of the control system.

15. The method of claim 14 wherein the step of increasing includes increasing an amplitude of the frequency.

16. The method of claim 15 wherein the step of increasing the amplitude includes injecting a signal to increase the amplitude of the frequency.

* * * * *